United States Patent
Nakahashi et al.

(10) Patent No.: US 12,523,785 B2
(45) Date of Patent: Jan. 13, 2026

(54) SCINTILLATOR STRUCTURE

(71) Applicant: Proterial, Ltd., Tokyo (JP)

(72) Inventors: Masanobu Nakahashi, Tokyo (JP); Naohiro Taniguchi, Tokyo (JP); Tamotsu Kibe, Tokyo (JP); Hikaru Chiyo, Tokyo (JP); Ryota Okamoto, Tokyo (JP)

(73) Assignee: PROTERIAL LTD., Tokyo (JP)

( * ) Notice: Subject to any disclaimer, the term of this patent is extended or adjusted under 35 U.S.C. 154(b) by 149 days.

(21) Appl. No.: 18/549,054

(22) PCT Filed: Feb. 24, 2022

(86) PCT No.: PCT/JP2022/007652
§ 371 (c)(1),
(2) Date: Sep. 5, 2023

(87) PCT Pub. No.: WO2022/209469
PCT Pub. Date: Oct. 6, 2022

(65) Prior Publication Data
US 2024/0151860 A1 May 9, 2024

(30) Foreign Application Priority Data
Apr. 2, 2021 (JP) ................. 2021-063291

(51) Int. Cl.
*G01T 1/20* (2006.01)
(52) U.S. Cl.
CPC .......... *G01T 1/2002* (2013.01); *G01T 1/2018* (2013.01)

(58) Field of Classification Search
CPC ....... G01T 1/2002; G01T 1/2018; G01T 1/20; C09K 11/02; C09K 11/7771; G21K 2004/08; G21K 4/00
See application file for complete search history.

(56) References Cited

U.S. PATENT DOCUMENTS 5,258,145 A * 11/1993 Nelson ................. G21K 4/00
313/469
5,981,959 A * 11/1999 Apte ................. G01T 1/2006
250/483.1
(Continued)

FOREIGN PATENT DOCUMENTS

| JP | H03-163391 A | 7/1991 |
| JP | S63-100391 A | 5/1998 |

(Continued)

OTHER PUBLICATIONS

International Search Report mailed on Jul. 12, 2022, in connection with the corresponding International Application No. PCT/JP2022/007652 (5 pp., including machine-generated English translation).
(Continued)

*Primary Examiner* — Kiho Kim
(74) *Attorney, Agent, or Firm* — McCormick, Paulding & Huber PLLC (57) ABSTRACT

Reliability of a scintillator structure is improved. The scintillator structure includes a plurality of cells and a reflective layer covering the plurality of cells. Here, each of the plurality of cells includes a resin and a phosphor, and the resin has a decrease rate of a total light transmittance that is less than 8% with respect to light having a wavelength of 542 nm after X-ray irradiation of a dose of 100 kGy.

8 Claims, 3 Drawing Sheets

(56) References Cited

U.S. PATENT DOCUMENTS

| | | | | |
|---|---|---|---|---|
| 2003/0236388 A1* | 12/2003 | Armstrong | ............. | C08G 59/42 |
| | | | | 528/418 |
| 2010/0116997 A1 | 5/2010 | Homma et al. | | |
| 2012/0298876 A1 | 11/2012 | Kaneko et al. | | |
| 2015/0059963 A1* | 3/2015 | Nitta | ....................... | B32B 37/24 |
| | | | | 156/247 |

FOREIGN PATENT DOCUMENTS

| | | |
|---|---|---|
| JP | 2004-150932 A | 5/2004 |
| JP | 2005-030806 A | 2/2005 |
| JP | 2006-162621 A | 6/2006 |
| JP | 2009-031098 A | 2/2009 |
| JP | 2012-002627 A | 1/2012 |

OTHER PUBLICATIONS

Notification of Reasons for Rejection and its English translation for corresponding Japanese Patent Application No. 2021-063291 dated Oct. 11, 2024.
Extended European Search Report for European Patent App. No. / Patent No. 22779694.3-1001 / 4318049 PCT/JP2022007652, dated Feb. 3, 2025.
Notification of Reasons for Rejection and English translation thereof for corresponding Japanese Patent Application No. 2024-226163 dated Oct. 17, 2025 (18 pages).

\* cited by examiner

SCINTILLATOR STRUCTURE

CROSS-REFERENCE TO RELATED APPLICATIONS

This application is a National Stage application of International Patent Application No. PCT/JP2022/007652, filed on Feb. 24, 2022, which claims priority to Japanese Patent Application No. 2021-063291, filed on Apr. 2, 2021, each of which is hereby incorporated by reference in its entirety.

TECHNICAL FIELD

The present invention relates to a scintillator structure, and relates to a technique effectively applied to, for example, a scintillator structure having a plurality of cells each including a resin and a phosphor.

BACKGROUND

Japanese Patent Application Laid-open Publication No. S63-100391 (Patent Document 1) discloses a technique relating to a phosphor molding body including a bisphenol A type epoxy resin.

Japanese Patent Application Laid-open Publication No. S63-100391

SUMMARY

Problems to be Solved by the Invention

A scintillator is a substance that absorbs energy of radiation to generate a visible light when being irradiated with the radiation typified by X-ray or gamma-ray. The scintillator is commercialized as a scintillator structure including a scintillator and a reflective layer, and an X-ray detector made of combination of the scintillator structure and a photoelectric converter such as a photodiode is used for, for example, medical equipment such as X-ray CT, analytical equipment, a non-destructive inspection apparatus using radiation, a radiation leakage inspection apparatus and others.

For example, ceramic made of gadolinium oxysulfide ($Gd_2O_2S$) is used for the scintillator. Here, in this specification, the gadolinium oxysulfide is referred to as "GOS". Strictly speaking, the gadolinium oxysulfide itself hardly emits light, and the gadolinium oxysulfide emits light when containing praseodymium, terbium, or the like. For this reason, the term "GOS" in this specification is intentionally implicitly used for a substance (phosphor) that emits light when the gadolinium oxysulfide itself contains praseodymium, terbium, or the like. However, if it is necessary to explicitly indicate that the gadolinium oxysulfide itself contains praseodymium, terbium or the like, it may be expressed as "GOS" containing praseodymium or "GOS" containing terbium.

Also, when the scintillator is made of a single "GOS", the "GOS" is made of ceramic. Meanwhile, as described later, it has been also considered to make the scintillator from a mixture of the "GOS" and a resin, and the "GOS" in this case is made of powder. Therefore, in this specification, when there is no particular need to specify ceramic and powder, the term "GOS" is simply used. On the other hand, when it is necessary to specify the ceramic, it is called "GOS" ceramic. Meanwhile, when it is necessary to specify the powder, it is called "GOS" powder.

This "GOS" has an advantage of having a higher visible-light emission output than that of cadmium tungstate ($CdWO_4$), but has a high manufacturing cost.

For this reason, in order to reduce the manufacturing cost of the scintillator structure, the use of the mixture of the "GOS" powder and a resin as the scintillator has been studied.

Regarding this point, reliability improvement is a high-priority item required for the scintillator structure. This is because the reliability improvement of the scintillator structure can lengthen a life of the radiation detector. Therefore, the scintillator is required to have high radiation resistance for the reliability improvement. In particular, as described above, when the scintillator is made of the mixture of the "GOS" powder and the resin, it is desired that the resin is less susceptible to alteration and deterioration when irradiated with radiation.

An objective of the present invention is reliability improvement of a scintillator structure.

Means for Solving the Problems

A scintillator structure according to one embodiment includes a plurality of cells and a reflective layer covering the plurality of cells. Here, each of the plurality of cells includes a resin and a phosphor, and a decrease rate of a total light transmittance of the resin relative to light having a wavelength of 542 nm obtained after the resin is irradiated with X-ray having a dose of 100 kGY is less than 8%.

Effects of the Invention

According to one embodiment, the reliability improvement of the scintillator structure can be achieved.

DETAILED DESCRIPTION

The same components are denoted by the same reference signs in principle throughout all the drawings for describing the embodiments, and the repetitive description thereof will be omitted. Note that hatching may be used even in a plan view so as to make the drawings easy to see.

<Outline of X-Ray Detector>

Figure 1:
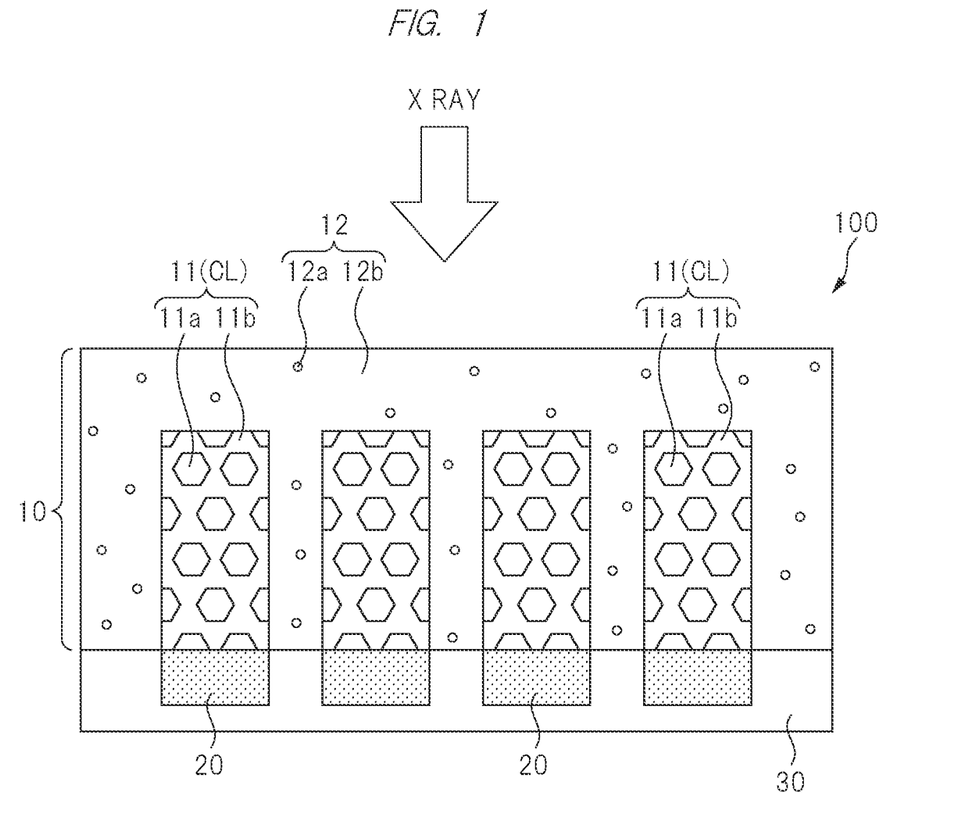
FIG. 1 is a diagram schematically showing an X-ray detector.

FIG. 1 is a diagram schematically showing an X-ray detector.

In FIG. 1, an X-ray detector 100 includes a scintillator structure 10 and a light receiving element 20. The scintillator structure 10 is made of a plurality of scintillators 11 configured to generate visible light from X-ray incident on the X-ray detector 100, and a reflective layer 12 covering each of the plurality of scintillators 11. On the other hand, the light receiving element 20 has a function of generating electric current from the visible light generated by the scintillator 11, and is made of, for example, a photoelectric conversion element typified by a photodiode. The light receiving element 20 is provided on, for example, a support 30, and corresponds to each of the scintillators 11.

The scintillator 11 has a function of absorbing the X-ray and generating the visible light, and is made of a phosphor 11a and a resin 11b. Here, in the present specification, a material obtained by mixing the "GOS" powder configuring the phosphor 11a and the resin 11b is sometimes referred to as "resin GOS". That is, the scintillator 11 in the present embodiment is made of the "resin GOS". The phosphor 11a is the gadolinium oxysulfide including praseodymium, terbium, or the like, and the resin 11b is, for example, an epoxy resin. The reflective layer 12 is made of the resin 12b including reflective particles 12a made of titanium oxide.

In recent years, as shown in FIG. 1, in the scintillator structure 10, the scintillator 11 is divided into a plurality of cells (CL). That is, from the viewpoint of improving the resolution of X-ray images, the scintillator 11 is divided into the plurality of cells CL corresponding to each of the plurality of light receiving elements 20 (arraying of the scintillator 11). Thus, the scintillator structure 10 includes the plurality of cells CL and the reflective layer 12 covering the plurality of cells CL. Specifically, an upper surface and four side surfaces of the cell CL are covered with the reflective layer 12. On the other hand, a lower surface of the cell CL is not covered with the reflective layer 12 because it needs to be in contact with the light receiving element 20.

The X-ray detector configured as described above operates as follows.

In other words, when the X-ray is incident on the scintillator 11 of the scintillator structure 10, electrons in the phosphor 11a that configures the scintillator 11 receive the energy of the X-ray, and their state transit from a ground state to an excited state. Then, the electrons in the excited state transit to the ground state. At this time, visible light corresponding to an energy difference between the excited state and the ground state is emitted. By such a mechanism, the scintillator 11 absorbs the X-ray, and generates the visible light.

A part of the visible light generated from the scintillator 11 is directly incident on the light receiving element 20, and the other part of the visible light generated from the scintillator 11 is focused on the light receiving element 20 while being repeatedly reflected by the reflective layer 12 covering the scintillator 11. Subsequently, for example, when visible light is incident on the light receiving element 20 made of a photodiode, electrons of a semiconductor material configuring the photodiode are excited from a valence band to a conduction band by the energy of this visible light. As a result, electric current generated by the electrons excited to the conduction band flows through the photodiode. Then, the X-ray image is acquired based on the current output from the photodiode. Thus, the X-ray detector 100 can provide the X-ray image.

For example, as shown in FIG. 1, the scintillator structure 10 is made of a rectangular parallelepiped scintillator 11 and a reflective layer 12 covering the scintillator 11. Since the scintillator 11 having the rectangular parallelepiped shape is formed through processing steps such as a dicing step and a grinding step, a processed surface is formed on a surface of the rectangular parallelepiped shape. That is, the term "processed surface" means a mechanically-processed surface. Specifically, the "processed surface" includes a surface ground by a grinding wheel for adjusting a thickness of a workpiece or a surface of the workpiece cut by a slicing blade for the dicing process.

For example, in the scintillator 11 using the "resin GOS", the "processed surface" is defined as mixture of a surface from which the resin is exposed and a surface where the "GOS" powder is fractured. For example, FIG. 1 schematically shows a case where an interface between the scintillator 11 and the reflective layer 12 is the "processed surface" in the scintillator 11 using the "resin GOS". In this case, it can be seen that the "processed surface" includes mixture of a region where the resin 11b is cut and a region where the phosphor 11a ("GOS" powder) is fractured. The X-ray detector 100 is configured as described above.

<Reason for Adopting "Resin GOS">

As described above, in this embodiment, the "resin GOS" is adopted as the scintillator 11. The reason for this is explained below.

For example, cadmium tungstate (hereinafter referred to as "CWO") is used as the scintillator 11 configuring the scintillator structure 10. The "CWO" contains cadmium which is a control subject material to the RoHS Directive/REACH Regulation. For this reason, the "GOS" ceramic has been used as the scintillator 11 instead of "CWO" containing cadmium. The "GOS" ceramic has an advantage of higher visible light output but has a disadvantage of higher manufacturing cost than those of the "CWO".

Therefore, from the viewpoint of reducing the manufacturing cost, the "resin GOS" which is the mixture of the resin such as epoxy resin and the "GOS" powder has been considered to be adopted as the scintillator 11, instead of the "GOS" ceramic. In other words, in order to suppress increase in the manufacturing cost due to the "GOS" ceramic, there is a trend to use the "resin GOS" which is more inexpensive than the "GOS" ceramic, as the scintillator 11.

Here, the "resin GOS" is classified into a "first resin GOS" which is mixture of the epoxy resin and the "GOS" powder obtained by adding praseodymium (Pr) and cerium (Ce) to gadolinium oxysulfide and a "second resin GOS" which is mixture of the epoxy resin and the "GOS" powder obtained by adding terbium (Tb) and cerium (Ce) to gadolinium oxysulfide.

In addition, both the "first resin GOS" and the "second resin GOS" have the advantage of higher light emission output than that of the "CWO". Furthermore, there is also an advantage that the afterglow characteristics of the "first resin GOS" is equivalent to that of the "CWO". In other words, the performance of the scintillator structure 10 is required not only to have a high light emission output but also to have favorable afterglow characteristics.

Therefore, the afterglow characteristics will be described. The scintillator 11 configuring the scintillator structure 10 is a substance that generates the visible light when being irradiated with X-ray. A mechanism of generating the visible light the scintillator 11 when being irradiation with X-ray is as described below.

That is, when the scintillator 11 is irradiated with X-ray, the electrons in the scintillator 11 receive the energy from the X-ray, and their states transit from the ground state with low energy to the excited state with high energy. Then, the electrons in the excited state transit to the ground state with low energy. At this time, most of the excited electrons immediately transit to the ground state. On the other hand, some of the excited electrons transit to the ground state after a certain elapse of time.

The visible light generated by the transition of the electrons from the excited state to the ground state after the certain elapse of time becomes the afterglow. In other words, the afterglow is visible light that is generated when timing of the transition from the excited state to the ground state exists after the certain elapse of time from the time of the X-ray irradiation. A large afterglow means that the intensity of the visible light generated in the certain elapse of time from the X-ray irradiation is high. In this case, the afterglow generated by the previous X-ray irradiation remains until the next X-ray irradiation, and the remaining afterglow becomes noise. For this reason, it is desirable that the afterglow is small. In other words, the favorable afterglow characteristics mean that the afterglow is small. In this regard, the afterglow characteristics of the "first resin GOS" are equivalent to the afterglow characteristics of the "CWO".

Therefore, the "resin GOS" has the following advantages compared to the "CWO", and is excellent as the scintillator 11 capable of achieving both the performance and the manufacturing cost.

(1) The "resin GOS" has a higher light emission output than that of the "CWO".
(2) The afterglow characteristics of the "first resin GOS" are equivalent to the afterglow characteristics of the "CWO".
(3) Cadmium is not used for the "resin GOS".
(4) The "resin GOS" has a lower manufacturing cost than that of "CWO".

In addition, cesium iodide (CsI) is used for the scintillator 11, and the "resin GOS" has the following advantages compared to "CsI".

(1) The "second resin GOS" has better X-ray stopping characteristics than that of the "CsI".
(2) The afterglow characteristics of the "second resin GOS" is about 1/70 of that of the CsI.
(3) The "resin GOS" is a stable substance without deliquescence.

In addition, the "resin GOS" has the following advantages compared to the "GOS" ceramic. That is, the "resin GOS" and the "GOS" ceramic contain heavy metals such as "Gd", "Ga" or "Bi". These heavy metals are relatively expensive, and there are concerns about their adverse effects on living bodies and the environment due to their leakage. Therefore, it is desirable that an amount of such a heavy metal contained in the scintillator 11 is as small as possible. In this regard, in the "resin GOS" which is made of the mixture of the "GOS" powder and resin, a use amount of the "GOS" is less than that of the "GOS" ceramic that is bulk. This means that the "resin GOS" can configure the scintillator 11 with less heavy metal content than the "GOS" ceramic. From this, it can be said that the "resin GOS" is superior to the "GOS" ceramic in that it can provide the scintillator 11 with the less heavy metal content.

From the above, the "resin GOS" is regarded to be promising for the scintillator 11 that can achieve both the performance and the manufacturing cost.

<Specific Materials>

Subsequently, specific materials for the constituent elements of the scintillator structure 10 will be described.

<<Phosphor 11a>>

The phosphor 11a used in this embodiment is made of, for example, gadolinium oxysulfide or gadolinium-aluminum-gallium garnet (GGAG). Here, the gadolinium oxysulfide has a composition of "$Gd_2O_2S$" activated with at least one selected from, for example, praseodymium (Pr), cerium (Ce), and terbium (Tb). On the other hand, the "GGAG" has a main composition of $(Gd_{1-x}Lu_x)_{3+a}(Ga_uAl_{1-u})_{5-a}O_{12}$ (x=0 to 0.5, u=0.2 to 0.6, a=−0.05 to 0.15) activated with at least one selected from, for example, cerium (Ce), praseodymium (Pr), etc. However, the phosphor 11a is not limited to a specific composition.

<<Resin 11b and Resin 12b>>

The resin 11b and the resin 12b are made of a material that is less susceptible to alteration and deterioration when being irradiated with radiation. The materials of these resins 11b and 12b are the feature of the present embodiment, and the feature will be described later.

<<Reflective Particle 12a>>

For the constituent materials of the reflective particles 12a, white particles such as "$TiO_2$" (titanium oxide), "$Al_2O_3$" (aluminum oxide), and "$ZrO_2$" (zirconium oxide) can be exemplified. Here, for the reflective particles 12a, for example, bulk or a mixture of powder and resin can be used. In particular, the reflective particles 12a made of "rutile-type $TiO_2$" are desirable particles because of being excellent in light reflection efficiency. From the viewpoint of improving the light receiving efficiency of the light receiving element 20, the light reflectance of the reflective particles 12a is desirably equal to or more than 80%, and the light reflectance of the reflective particles 12a is more desirably equal to or more than 90%.

<<Other Additives>>

In addition to the components described above, other additives may be added to the scintillator 11 and the reflective member configuring the reflective layer 12. For example, it is desirable to add a curing catalyst to shorten the curing time of the resin.

<Consideration of Improvement>

For example, the epoxy resin is used as the resin contained in the "resin GOS". This epoxy resin contains at least a main agent and a curing agent as constituent materials. For example, a bisphenol A type epoxy resin is used as the main agent, and an amine-based curing agent is used as the curing agent. However, the present inventors have found out that, when a general epoxy resin that uses the bisphenol A type epoxy resin as the main agent and the amine-based curing agent as the curing agent is used as the resin configuring the "resin GOS", the material is deteriorated and discolored by repetitive irradiation with radiation (X-ray) over a long period of time.

The discoloration of the light transmissive resin means the large light absorption, and, as a result, this means decrease in the light transmittance. For this reason, the light generated from the scintillator made of the "resin GOS" is less likely to reach the light receiving element (photodiode), and therefore, the detection performance of the X-ray detector is reduced.

In other words, from the study of the present inventors, it has been found out that, when the general epoxy resin using the bisphenol A type epoxy resin as the main agent and the amine-based curing agent as the curing agent is used as the resin configuring the "resin GOS", the X-ray detector is difficult to provide the stable detection performance over a long period of time. In other words, as new findings, the present inventors have found out that it is difficult to ensure the reliability of the X-ray detector over the long period of time when the general epoxy resin described above is used as the resin configuring the "resin GOS".

Therefore, based on the above-described new findings, in order to ensure the reliability of the X-ray detector over the long period of time, it is found desirable to adopt, in place of the above general epoxy resin, it is desirable to use a resin that is difficult to be discolored even by the X-ray irradiation over the long period of time as the resin configuring the "resin GOS". And, the present inventors have found out the resin having excellent radiation resistance that is difficult to be discolored even by the X-ray irradiated over the long period of time, and therefore, this point will be described below.

Features of Embodiment

The feature of the present embodiment is that as the epoxy resin containing at least the main agent and the curing agent, the following epoxy resin is used in the resin contained in the "resin GOS" and the resin contained in the reflective material. As a result, the reliability of the X-ray detector having the scintillator structure according to the present embodiment as a constituent component can be ensured for a long period of time.

<<Main Agent>>

The main agent is a triazine derivative epoxy resin. As the triazine derivative epoxy resin, for example, 1,3,5-triazine derivative epoxy resin is exemplified. The 1,3,5-triazine derivative epoxy resin is desirably an epoxy resin having an "isocyanurate ring". This is because the epoxy resin having the "isocyanurate ring" in its skeleton has excellent stability against radiation and heat and is difficult to be discolored.

In particular, the epoxy resin having the "isocyanurate ring" in its skeleton is desirable to have a plurality of epoxy groups with respect to one isocyanurate ring from the viewpoint of suppressing the discoloration, and is desirable to have, for example, three epoxy groups with respect to one isocyanurate ring. This is because bonding of a plurality of epoxy groups to the isocyanurate ring provides high reactivity and strong stability, which results in difficulty of the discoloration even by the X-ray irradiation.

Examples of the epoxy resin having the "isocyanurate ring" include 1,3,5-triglycidyl isocyanurate, tris(2,3-epoxypropyl) isocyanurate, tris(α-methyl glycidyl)isocyanurate, tris(1-methyl-2,3-epoxypropyl)isocyanurate, 1,3,5-tris(2,3-epoxypropyl)-1,3,5-triazine-2,4,6(1H,3H,5H)-trione, 1,3,5-tris(3,4-epoxybutyl)-1,3,5-triazine-2,4,6(1H,3H,5H)-trione, 1,3,5-tris(5,6-epoxybutyl)-1,3,5-triazine-2,4,6(1H,3H,5H)-trione, tris{2,2-bis[(oxirane-2-ylmethoxy)methyl]butyl}-3,3',3''-[1,3,5-triazine-2,4,6(1H,3H,5H)-trione-1,3,5-triyl] tripropanoate and the like.

Examples of a commercial product of the triazine derivative epoxy resin (the epoxy resins having the "isocyanurate ring") include "TEPIC-G", "TEPIC-S", "TEPIC-SS", "TEPICHP", "TEPIC-L" and "TEPIC-PAS" that are commercially available products of the 1,3,5-tris(2,3-epoxypropyl)-1,3,5-triazine-2,4,6(1H,3H,5H)-trione produced by Nissan Chemical Corporation, "TEPIC-VL" that is a commercially available product of the 1,3,5-tris(3,4-epoxybutyl)-1,3,5-triazine-2,4,6(1H,3H,5H)-trione produced by Nissan Chemical Corporation, "TEPIC-FL" that is a commercially available product of the 1,3,5-tris(5,6-epoxybutyl)-1,3,5-triazine-2,4,6(1H,3H,5H)-trione produced by Nissan Chemical Corporation, [TEPIC-UC] that is a commercially available product of the tris {2,2-bis[(oxirane-2-ylmethoxy)methyl]butyl}-3,3',3''-[1,3,5-triazine-2,4,6(1H,3H,5H)-trione-1,3,5-triyl]tripropanoate produced by Nissan Chemical Corporation and others.

<<Curing Agent>>

For the curing agent, it is desirable to use a material that does not have a carbon-carbon double bond in order to suppress the discoloration due to the X-ray irradiation. This is because the carbon-carbon double bond has a weaker bond strength than that of a carbon-carbon single bond and is easily broken by the X-ray irradiation, which results in easiness of the discoloration of the material. For example, an acid anhydride curing agent typified by a phthalic anhydride-based curing agent can be used as the curing agent. In particular, from the viewpoint of effectively suppressing the discoloration due to the X-ray irradiation, single use of one type of polyprotic carboxylic acid anhydride that is non-aromatic and does not chemically have the carbo-carbon double bond, or combination use of two or more types of them may be applied.

Specifically, examples of the curing agents include tetrahydrophthalic anhydride, methyltetrahydrophthalic anhydride, hexahydrophthalic anhydride, methylhexahydrophthalic anhydride, methylnadic anhydride, and dodecenylsuccinic anhydride can be mentioned. In particular, it is desirable to use methylhexahydrophthalic anhydride.

Specific examples of the acid anhydride compound include "RIKACID TH", "TH-1A", "HH", "MH", "MH-700", and "MH-700G" (all produced by New Japan Chemical Co., Ltd.) and the like.

<<Curing Catalyst>>

The curing catalyst is not an essential constituent material, but is desirably added from the viewpoint of promoting the curing reaction of the main agent. As the curing catalyst, it is desirable to use an organophosphorus compound that is difficult to be discolored even by the X-ray irradiation. Specifically, examples of the curing catalyst include tetrabutylphosphonium o,o-diethylphosphorodithioate (HISHICOLIN PX-4ET produced by Nippon Kagaku Kogyo Co., Ltd.), methyltributylphosphonium dimethylphosphate (HISHICOLIN PX-4MP produced by Nippon Chemical Industrial Co., Ltd.) and the like.

<Verification of Effect>

Verification results indicating that the above-described "resin GOS" containing the triazine derivative epoxy resin can suppress the decrease in the "total light transmittance" even after the X-ray irradiation will be explained.

The term "total light transmittance" described in this specification is intended to also include light transmitted in a direction shifting from the incident direction due to scattering inside the scintillator. In other words, the "total light transmittance" represents the transmittance in a case including not only the transmitted light that passes rectilinearly from the incident direction but also the transmitted light that is scattered inside the scintillator and shifted from the rectilinear traveling direction. A reason why this "total light transmittance" is used is that, in the scintillator structure, the light scattered inside the cell also contributes to the detection of radiation at the light receiving element since the light scattered inside the cells is also repeatedly reflected and finally enters the light receiving element on the bottom surface of the cell as a result of the cell made of the scintillator being covered with the reflective layer. That is, the "total light transmittance" is used for the evaluation with consideration of all transmitted light types contributing to the detection of radiation.

Also, the "total light transmittance" described in the present specification means the total light transmittance measured while light having a wavelength of 542 nm is used for a sample having a thickness of 1.5 mm. In addition, in the measurement of the "total light transmittance", the "total light transmittance" of each sample was measured, the sample being prepared to have "length×width×thickness" of "15 mm×15 mm×1.5 mm", the surface of which was mirror-finished.

TABLE 1

|  | Sample A | Sample B |
|---|---|---|
| Total light transmittance (0 kGy) | 91.358 | 90.902 |
| Total light transmittance (100 kGy) | 87.425 | 78.361 |
| Total light transmittance difference | 3.933 | 12.541 |
| Decrease rate of total light transmittance | 4.5% | 16% |

Table 1 is a table showing the verification results for sample A and sample B.

In Table 1, the sample A represents the "resin GOS" in the present embodiment, and is the "resin GOS" using the triazine derivative epoxy resin as the main agent and using "Me-HHPA (material name: methylhexahydrophthalic anhydride, product name: "RIKACID MH-T" produced by New Japan Chemical Co., Ltd.) as the curing agent. On the other hand, the sample B represents the "resin GOS" in the related art, and is the "resin GOS" using the bisphenol A type epoxy resin as the main agent and using the amine-based compound as the curing agent.

As shown in Table 1, in the sample A, the initial "total light transmittance (0 kGy)" before the X-ray irradiation was "91.358", while the "total light transmittance (100 kGy)" after the X-ray irradiation at a dose of 100 kGy was "87.425", and the "total light transmittance difference" was "3.933".

On the other hand, in the sample B, the initial "total light transmittance (0 kGy)" before the X-ray irradiation was "90.902", while the "total light transmittance (100 kGy)" after the X-ray irradiation at a dose of 100 kGy was "78.361", and the "total light transmittance difference" was "12.541".

As a result, the "decrease rate of total light transmittance" of the sample A was "4.5%", while the "decrease rate of total light transmittance" of the sample B was "16%". Therefore, from the results in Table 1, it can be confirmed that the "resin GOS" in the present embodiment can suppress the decrease in the "total light transmittance" even after the X-ray irradiation.

In particular, as the results in Table 1, the "resin GOS" of the present embodiment can achieve the excellent performance showing that the decrease rate of the total light transmittance to the light having the wavelength of 542 nm is less than 8% after the X-ray irradiation at the dose of 100 kGy while securing the initial total light transmittance to the light having the wavelength of 542 nm is equal to or more than 90% before the X-ray irradiation. Therefore, the use of the "resin GOS" according to the present embodiment can provide the scintillator structure with high light emission output and excellent radiation resistance. As a result, the use of the scintillator structure according to the present embodiment can provide the X-ray detector with excellent reliability that can maintain the stable detection performance over the long period of time.

In particular, the verification results in the present embodiment have great technical significance in that the verification results support the suppression of the decrease rate of the total light transmittance of the "resin GOS" containing the triazine derivative epoxy resin even after the X-ray irradiation at the high dose of 100 kGy.

For example, even if it is known that a material has the radiation resistance, it cannot be said whether the material can practically secure the reliability of the X-ray detector over the long period of time if it is unknown how much dose of the X-ray irradiation the material is resistant to. That is, even the material having simply qualitatively the radiation resistance cannot secure the reliability of the X-ray detector using X-ray of high dose over the long period of time. In this regard, the present embodiment shows the verification results obtained after the X-ray irradiation at the high dose of 100 kGy, and states that the "resin GOS" containing the triazine derivative epoxy resin has the excellent radiation resistance. Here, the verification indicating that the "resin GOS" containing the triazine derivative epoxy resin can suppress the decrease in "total light transmittance" even after the X-ray irradiation at 100 kGy shows the great technical significance. This is because the verification results are data based on the premise of the high dose of 100 kGy, and therefore, can provide reliable data as the ground that secures the reliability of the X-ray detector using the X-ray at high dose over the long period of time.

<Method of Manufacturing Scintillator Structure>

Next, a method of manufacturing the scintillator structure will be described.

Figure 2:
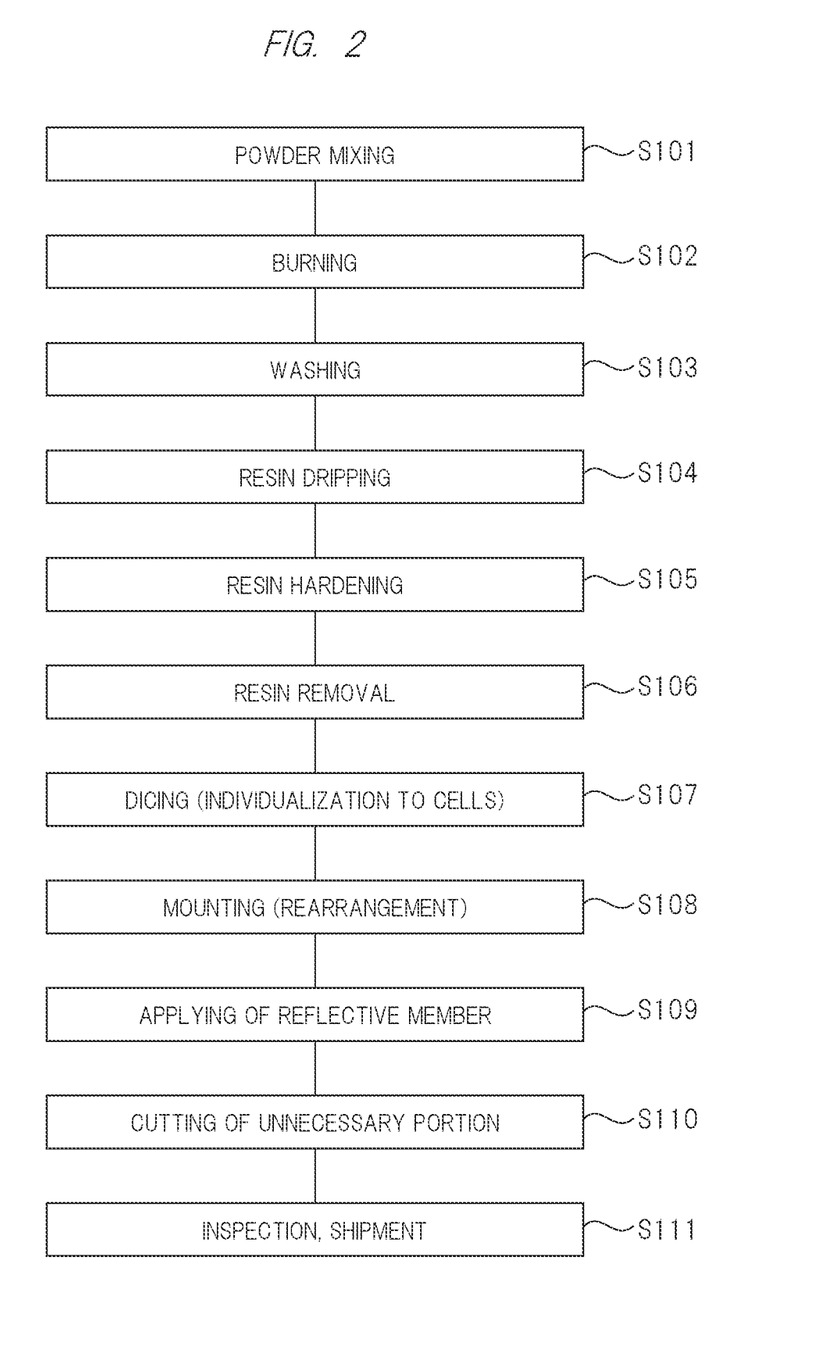
FIG. 2 is a flowchart for explaining a flow of steps of manufacturing a scintillator structure.

FIG. 2 is a flowchart for explaining a flow of steps of manufacturing the scintillator structure.

In FIG. 2, first, after weighing and mixing predetermined amounts of a raw material powder and a flux component (S101), this mixture was filled in a crucible and burned in an air furnace at 1300° C. to 1400° C. for 7 to 9 hours (S102) to prepare the "GOS" powder. Then, the flux component and impurities contained in the "GOS" powder were removed by washing using hydrochloric acid and warm water (S103). Next, the epoxy resin was dripped to the "GOS" powder to impregnate the "GOS" powder with the epoxy resin (S104). Next, after curing the epoxy resin (S105), the epoxy resin not mixed with the "GOS" powder was removed (S106). In the manner, the scintillator made of the "resin GOS" was formed.

Subsequently, a substrate on which the scintillator is formed was diced to individualize the substrate into a plurality of cells (S107). The plurality of individualized cells were re-arranged (S108), and then, the reflective material was applied so as to cover the plurality of cells (S109). Then, after cutting the unnecessary part as the scintillator structure 10A (S110), the scintillator structures having passed the inspection were shipped (S111).

Figure 3:
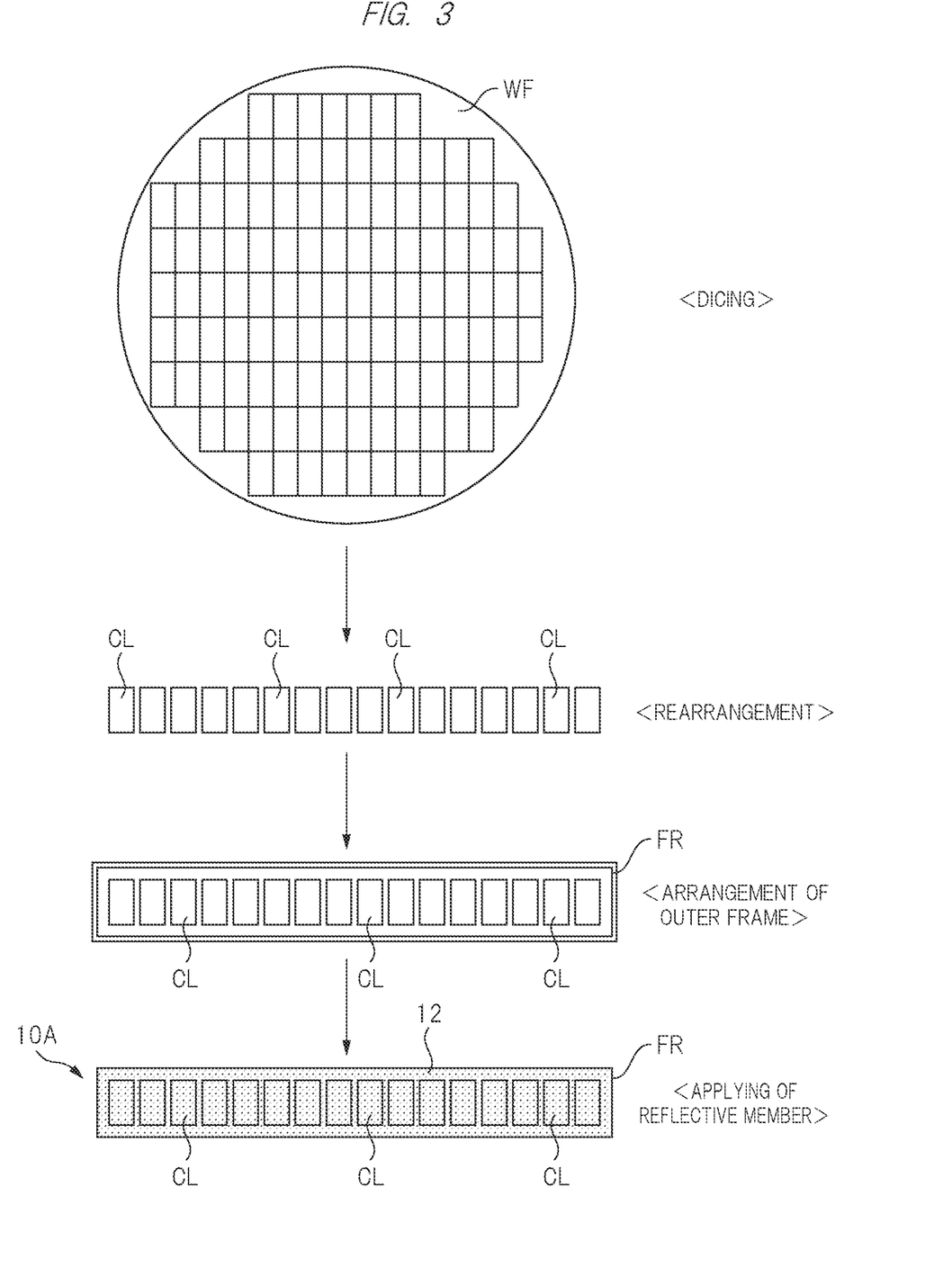
FIG. 3 is a diagram schematically showing steps from a dicing step to a step of applying a reflective member.

FIG. 3 is a diagram schematically showing the steps from the dicing step to the reflective-material applying step.

As shown in FIG. 3, the substrate WF on which the scintillator made of the "resin GOS" is formed is diced to individualize the substrate WF into the plurality of cells CL. Then, the plurality of individualized cells CL is re-arranged in, for example, a line form. After that, an outer frame FR is arranged so as to include the plurality of cells CL linearly re-arranged. Next, the reflective material made of the epoxy resin containing, for example, titanium oxide is applied so as to cover the plurality of cells CL arranged in the outer frame FR. After that, the outer frame FR is removed. The scintillator structure 10A is manufactured as described above.

FIG. 3 has been explained in the example of the linearly-arranged scintillator structure 10A using "1×n cells". However, the technical idea of the present embodiment is not limited to this, and is also applicable to, for example, an array-arranged (matrix-arranged) scintillator structure using "n×n cells".

Working Example

Detailed verification results that support the effects of the technical idea of the present embodiment will be described below based on working examples. Note that the technical idea of the present embodiment is not limited to these working examples.

TABLE 2

| | Item | | | First working example | Second working example | Third working example | Comparative example |
|---|---|---|---|---|---|---|---|
| Component | Main Agent | Triazine derivative epoxy resin | TEPIC-PAS B22 | 100 | | | |
| | | | TEPIC-VL | | 100 | | |
| | | | TEPIC-FL | | | 100 | |
| | | Bisphenol A type epoxy resin | Epicron 840 | | | | 100 |
| | Curing agent | Acid anhydride | Rikacid MH-T | 88.4 | 124.4 | 96.0 | 90.8 |
| | Curing catalyst | Organic phosphorous-based compound | Hishicolin PX-4ET | 1 | 1 | 1 | 1 |
| Evaluation | Initial total light transmittance (%) | | | 93 | 91 | 90 | 91 |
| | Total light transmittance (after 100 kGy irradiation) (%) | | | 90 | 87 | 86 | 78 |
| | Decrease rate of total light transmittance (%) | | | 3.2 | 4.4 | 4.4 | 14.3 |

Table 2 is a table showing evaluation results based on samples.

First, the samples will be explained.

<<Materials>>

"GOS" powder: gadolinium oxysulfide ($Gd_2O_2S$)

Main Agent:

First working example: Triazine derivative epoxy resin (TEPIC-PAS B22)

Second working example: Triazine derivative epoxy resin (TEPIC-VL)

Third working example: Triazine derivative epoxy resin (TEPIC-FL) Comparative example: Hydrogenated bisphenol A diglycidyl ether epoxy resin (Epicron840 (DIC))

Curing agent: Acid anhydride (RIKACID MH-T)

Curing catalyst: Organophosphorus compound (HISHICOLIN PX-4ET)

<<Sample Preparation>>

Samples having blending amounts (stoichiometric amount: equivalent ratio) shown in Table 2 were prepared under primary curing conditions (90° C., 15 hours) and secondary curing conditions (120° C., 2.5 hours).

An each shape of the samples is "15 mm×15 mm×1.5 mm" (length×width×thickness), and an each surface of the samples was mirror-finished.

<<Evaluation Method>>

After the X-ray irradiation of 100 kGy on each sample, the "total light transmittance" with respect to light having a wavelength of 542 nm was measured by a UV-visible-near-infrared spectrophotometer V-570 produced by JASCO Corporation.

Here, the total light transmittance was measured by using an integrating sphere device and a reflective plate to collect diffuse transmitted light and rectilinear transmitted light onto the detector.

<<Evaluation Results>>

As shown in Table 2, the initial "total light transmittance" before the X-ray irradiation was equal to or more than 90% in all of the first to third working examples and comparative example. On the other hand, the "total light transmittance" after the X-ray irradiation of the dose of 100 kGy in the first to third working examples was equal to or more than 80%, while the same in the comparative example did not reach 80%. The "decrease rate of the total light transmittance" converted from each result in the first to third working examples was less than 5%, while the same in the comparative example was equal to or more than 14%.

It can been seen that the above-described results support the fact that the "resin GOS" in the first to third working examples can suppress the decrease in the "total light transmittance" even after the X-ray irradiation.

In particular, from the results in Table 2, it can been seen that the "resin GOS" in the first to third working examples can provide such excellent performance in which the decrease rate of the total light transmittance with respect to the light having the wavelength of 542 nm after the X-ray irradiation of the dose of 100 kGy is less than 5% while the initial total light transmittance with respect to the light having the wavelength of 542 nm before the X-ray irradiation is secured to be equal to or more than 90%. Therefore, by using the "resin GOS" in the first to third working examples, the scintillator structure with high light emission output and excellent radiation resistance can be provided. By using this scintillator structure, the highly reliable X-ray detector capable of maintaining the stable detection performance over the long period of time can be provided.

In the foregoing, the invention made by the inventors of the present application has been concretely described on the basis of the embodiments. However, it is needless to say that the present invention is not limited to the foregoing embodiments, and various modifications can be made within the scope of the present invention.

The invention claimed is:

1. A scintillator structure comprising:
    a plurality of cells; and
    a reflective layer covering the plurality of cells,
    wherein each of the plurality of cells includes a resin and a phosphor,
    wherein the resin has a decrease rate of a total light transmittance that is less than 8% with respect to light having a wavelength of 542 nm after X-ray irradiation of a dose of 100 kGy, and
    wherein the resin includes:
        a main agent containing a triazine derivative epoxy resin;
        a curing agent; and
        a curing catalyst.

2. The scintillator structure according to claim 1,
wherein an initial total light transmittance of the resin with respect to the light having the wavelength of 542 nm before the X-ray irradiation is equal to or more than 90%.

3. The scintillator structure according to claim 1,
wherein the triazine derivative epoxy resin has an isocyanurate ring.

4. The scintillator structure according to claim 3,
wherein the triazine derivative epoxy resin has a plurality of epoxy groups with respect to one isocyanurate ring.

5. The scintillator structure according to claim 4,
wherein the triazine derivative epoxy resin has three epoxy groups with respect to one isocyanurate ring.

6. The scintillator structure according to claim 1,
wherein the curing agent is an acid anhydride curing agent.

7. The scintillator structure according to claim 6,
wherein the acid anhydride curing agent is a phthalic anhydride curing agent.

8. The scintillator structure according to claim 1,
wherein the curing catalyst is an organophosphorus compound.

* * * * *